United States Patent
Jammet et al.

(10) Patent No.: US 6,924,013 B1
(45) Date of Patent: *Aug. 2, 2005

(54) COEXTRUSION BINDER, ITS USE FOR A MULTILAYER STRUCTURE AND THE STRUCTURE THUS OBTAINED

(75) Inventors: Jean-Claude Jammet, Amiens (FR); Christophe Le Roy, Evreux (FR); Xavier Marical, Beaumesnil (FR); Jérôme Pascal, Saint Cyr de Salerne (FR)

(73) Assignee: Arkema (formerly ATOFINA), Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/544,613

(22) Filed: Apr. 6, 2000

(30) Foreign Application Priority Data

Apr. 6, 1999 (FR) .............................................. 99 04261

(51) Int. Cl.[7] .............................................. B29D 22/00
(52) U.S. Cl. ................ 428/35.7; 428/475.8; 428/476.1; 428/476.9; 428/483; 428/522; 525/74; 525/77; 525/78; 525/193; 525/240
(58) Field of Search .............................. 428/35.7, 475.8, 428/476.1, 476.9, 483, 522; 525/74, 240, 77, 78, 193

(56) References Cited

U.S. PATENT DOCUMENTS

| 4,397,916 A | * | 8/1983 | Nagano ....................... 428/461 |
| 4,460,632 A | | 7/1984 | Adur et al. .................... 428/35 |
| 4,460,745 A | * | 7/1984 | Adur et al. .................... 525/24 |
| 4,487,885 A | | 12/1984 | Adur et al. .................... 525/74 |
| 4,537,836 A | | 8/1985 | Adur et al. .................... 428/522 |
| 6,528,587 B2 | * | 3/2003 | Robert et al. ................ 525/191 |
| 6,545,091 B1 | * | 4/2003 | Lee et al. ..................... 525/78 |

FOREIGN PATENT DOCUMENTS

| EP | 0 035 392 | | 9/1981 | |
| EP | 0035392 | * | 9/1981 | .......... B32B/15/08 |
| EP | 0 742 236 | | 11/1996 | |
| EP | 0 802 207 | | 10/1997 | |
| EP | 0 816 460 | | 1/1998 | |

* cited by examiner

*Primary Examiner*—Harold Pyon
*Assistant Examiner*—Jane Rhee
(74) *Attorney, Agent, or Firm*—Millen, White, Zelano & Branigan, P.C.

(57) ABSTRACT

The present invention relates to a coextrusion binder useful for petrol tanks of HDPE/binder/EVOH or PA/binder/HDPE structure.

26 Claims, No Drawings

COEXTRUSION BINDER, ITS USE FOR A MULTILAYER STRUCTURE AND THE STRUCTURE THUS OBTAINED

CROSS REFERENCE TO RELATED APPLICATION

This application is related to a concurrently filed application entitled, "Coextrusion Binder, Its Use For A Multilayer Structure And The Structure Thus Obtained" the inventors being, Christophe Le Roy, Xavier Marical and Jêrôme Pascal, "Ser. No. 09/544,614, filed Apr. 6, 2000", based on priority French application 99/04262 filed Apr. 6, 1999, said application being incorporated by reference herein.

FIELD OF THE INVENTION

The present invention relates to a coextrusion binder, to its use for making a multilayer structure and to the structure thus obtained.

SUMMARY OF THE INVENTION

More specifically, the coextrusion binder of the present invention comprises:
- 5 to 30 parts of a polymer (A), itself comprising a blend of a polyethylene (A1) of relative density between 0.910 and 0.940 and of a polymer (A2) chosen from elastomers, very low-density polyethylenes and metallocene polyethylenes, the (A1)+(A2) blend being cografted with an unsaturated carboxylic acid;
- 95 to 70 parts of a polyethylene (B) of relative density between 0.910 and 0.930;
- the blend of (A) and (B) being such that:
- its relative density is between 0.910 and 0.930,
- the content of grafted unsaturated carboxylic acid is between 30 and 10,000 ppm,
- the MFI (ASTM D 1238; 190° C./2.16 kg) is between 0.1 and 3 g/10 min., MFI standing for the melt flow index, expressed in grams per 10 minutes.

The present invention also relates to a multilayer structure comprising a layer which comprises the coextrusion binder defined above and, directly attached to the latter, a layer (E) of a nitrogen-containing or oxygen-containing polar resin, such as a layer of a polyamide resin, of an aliphatic polyketone, of a saponified ethylene-vinyl acetate copolymer (EVOH) or of a polyester resin, or else a metal layer.

The invention also relates to a structure comprising the above structure and, directly attached to the latter on the binder side, either a polyolefin layer (F) or a layer of a resin chosen from the resins of the layer (E), or else a metal layer.

The invention also relates to a structure comprising, respectively, a polyolefin layer (F), a layer of the binder defined above, a layer of a polyamide resin or of a saponified ethylene-vinyl acetate copolymer (EVOH), a layer of the binder defined above and a polyolefin layer (F).

These structures are useful for manufacturing flexible or rigid packages, such as sachets, bottles or containers. These packages may be manufactured by coextrusion, lamination or coextrusion-blow moulding.

The invention is useful in particular for coextruded hoses or pipes and for motor-vehicle petrol tanks.

Petrol tanks usually consist of five layers consisting respectively of:
- high-density polyethylene (HDPE);
- a binder;
- a polyamide (PA) or a copolymer having ethylene units and vinyl alcohol units (EVOH);
- a binder;
- HPDE.

Very often, a sixth layer is added between one of the binder layers and one of the HDPE layers. This sixth layer consists of manufacturing scrap resulting from the moulding of the tanks or, for a much smaller quantity, tanks which are off-specification. This scrap and these off-specification tanks are ground up in order to obtain granules. This regrind is then remelted and extruded directly on the plant for coextruding the tanks. This regrind could also be melted and regranulated by an extrusion machine, such as a twin-screw extruder, before it is reused.

According to the variant, the recycled product may be blended with the HDPE of the two outermost layers of the tank. It is also possible, for example, to blend the granules of recycled product with the virgin HDPE granules of these two layers. Any combination of these recycling operations may also be used.

The amount of recycled material may represent up to 50% of the total weight of the tank.

This sixth layer therefore includes all the materials of the multilayer structure, namely HDPE, binders, PA or EVOH.

BACKGROUND OF THE INVENTION

The prior art has already described multilayer petrol tanks. EP 834,415 describes structures comprising: polyethylene/binder/EVOH/binder/polyethylene.

The binder is a maleic-anhydride-grafted polyethylene having an MFI of 0.1 to 3 and a relative density between 0.920 and 0.930 and it contains 2 to 40% by weight of material insoluble in n-decane at 90° C. It is explained that the grafted polyethylene is dissolved in n-decane at 140° C. and cooled to 90° C., at which temperature products precipitate; it is then filtered and the insoluble content is the percentage by weight which precipitates and is collected by filtration at 90° C.

If the content is between 2 and 40%, the binder has good petrol resistance.

No example shows such a polymer. The text specifies that the binder is in fact a blend to 2 to 30 parts of a grafted polyethylene having a relative density between 0.930 and 0.980 and of 70 to 98 parts of an ungrafted polyethylene having a relative density between 0.910 and 0.940.

An attempt has been made to prepare binders and the corresponding structures in accordance with this teaching. It has found that the binders were not reproducible, that is to say the choice of the product by its relative density is not a sufficient indication. It has also been found that these criteria were not sufficient for the binder to withstand petrol.

DETAILED DESCRIPTION OF THE INVENTION

The invention will now be described in detail.

With regard to the polymer (A1), this is a polyethylene homopolymer or a copolymer of ethylene with a comonomer chosen, for example, from:
- α-olefins, advantageously those having from 3 to 30 carbon atoms. Examples of α-olefins having 3 to 30 carbon atoms as possible comonomers comprise propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene and 1-triacontene. These α-olefins may be used by themselves or as a blend of two or more of them;

the esters of unsaturated carboxylic acids, such as, for example, alkyl (meth)acrylates, the alkyl of which has from 1 to 24 carbon atoms. Examples of alkyl acrylates or methacrylates that can be used are, in particular, methyl methacrylate, ethyl acrylate, n-butyl acrylate, isobutyl acrylate and 2-ethylhexyl acrylate;

the vinyl esters of saturated carboxylic acids, such as, for example, vinyl acetate or vinyl propionate.

The relative density of (A1) is advantageously between 0.915 and 0.925.

The MFI of (A1) is 0.1 to 8 g/10 min.

Preferably (A1) is an ethylene/α-olefin copolymer of the LLDPE (linear low-density polyethylene) type.

By way of examples of elastomers (A2), mention may be made of ethylene/propylene (EPR), ethylene/propylene/diene, ethylene/1-butene, ethylene/1-butene/diene, ethylene/propylene/1-butene/diene and ethylene/4-methyl-1-pentene copolymers and blends of at least two of these elastomers.

(A2) may also be a styrene/butadiene/styrene block copolymer (SBS), a styrene/ethylene-butylene/styrene block copolymer (SEBS) or a styrene/isoprene/styrene block copolymer (SIS).

(A2) may also be a VLDPE (very low-density polyethylene). These are ethylene/α-olefin copolymers having a relative density that may be between 0.860 and 0.910.

(A2) may also be a metallocene polyethylene.

The expression "metallocene polyethylene" should be understood to mean the polymers obtained by the copolymerization of ethylene with an α-olefin such as propylene, butene, hexene or octene in the presence of a monosite catalyst generally consisting of an atom of a metal, which may for example be zirconium or titanium, and of two alkyl cyclic molecules linked to the metal. More specifically, the metallocene catalysts are usually composed of two cyclopentadiene rings linked to the metal. These catalysts are frequently used with aluminoxanes as cocatalysts or activators, preferably methylaluminoxane (MAO). Hafnium may also be used as the metal to which the cyclopentadiene is attached. Other metallocenes may include transition metals of Groups IVA, VA and VIA. Metals of the lanthanide series may also be used.

These metallocene polyethylenes may also be characterized by their $\overline{M_w}/\overline{M_n}$ ratio <3 and preferably <2.

The relative density of (A2) is advantageously between 0.860 and 0.880.

That is to say, (A2) represents a range of polymers going from thermoplastic resins to elastomers. Preferably, (A2) is an elastomer, ethylene/propylene and also ethylene/octene and ethylene/hexene copolymers and ethylene/1-butene copolymers are those preferred most. Preferably, the ethylene/propylene copolymer and the ethylene/1-butene copolymer have a melt flow index (measured at 190° C. according to ASTM D 1238-65T) of 0.1 to 20 and an ethylene content of 60 to 90 mol %.

The relative density of (A2) must be chosen so that the blend of (A), (that is to say A1+A2) and (B) has a relative density between 0.910 and 0.930 and preferably between 0.915 and 0.920. The MFI of (A2) is advantageously from 0.1 to 20.

Advantageously, 60 to 90 parts of (A1) per 40 to 10 parts of (A2) are used.

The blend of (A1) and (A2) is grafted with an unsaturated carboxylic acid, that is to say (A1) and (A2) are cografted. It would not be outside the scope of the invention to use a functional derivative of this acid.

Examples of unsaturated carboxylic acids are those having 2 to 20 carbon atoms, such as acrylic, methacrylic, maleic, fumaric and itaconic acids. The functional derivatives of these acids comprise, for example, anhydrides, ester derivatives, amide derivatives, imide derivatives and metal salts (such as alkali metal salts) of unsaturated carboxylic acids.

Unsaturated dicarboylic acids having 4 to 10 carbon atoms and their functional derivatives, particularly their anhydrides, are particularly preferred grafting monomers.

These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo-[2.2.1]hept-5-ene-2,3-dicarboxylic and x-methyl-bicyclo[2.2.1]hept-5-ene-2,2-dicarboxylic anhydrides.

Examples of other grafting monomers comprise $C_1–C_8$ alkyl esters or glycidyl ester derivatives of unsaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monoethyl fumarate, dimethyl fumarate, monomethyl itaconate and diethyl itaconate; amide derivatives of unsaturated carboxylic acids, such as acrylamide, methacrylaide, the monoamide of maleic acid, the diamide of maleic acid, the N-monoethylamide of maleic acid, the N,N-diethylamide of maleic acid, the N-monobutylamide of maleic acid, the N,N-dibutylamide of maleic acid, the monoamide of fumaric acid, the diamide of fumaric acid, the N-monoethylamide of fumaric acid, the N,N-diethylamide of fumaric acid, the N-monobutylamide of fumaric acid and the N,N-dibutylamide of fumaric acid; imide derivatives of unsaturated carboxylic acids, such as maleimide, N-butylmaleimide, N-phenylmaleimide; and metal salts of unsaturated carboxylic acids, such as sodium acrylate, sodium methacrylate, potassium acrylate and potassium methacrylate. Maleic anhydride is preferred.

Various known processes may be used to graft a grafting monomer onto the blend of (A1) and (A2). The blend can contain at levels between 10 ppm and 5% additives generaly used for processing of polyolefins and such as antioxidants based on substituted phenolic molecules etc . . . , anti UV agents, processing aids such as fatty amides, stearic acid and salt of stearic acid, fluorinated polymers known to prevent extrusion defaults, anti fog agents based on amines, antiblocking agents such as silica or talc, master batches with dyes, nucleating agents etc . . . .

For example, this may be carried out by heating the polymers (A1) and (A2) to high temperatures, approximately 150 to approximately 300° C., in the presence or absence of a solvent and with or without a radical initiator. Suitable solvents that may be used in this reaction are benzene, toluene, xylene, chlorobenzene, cumene, etc. Suitable radical initiators which can be used comprise tert-butyl hydroperoxide, cumene hydroperoxide, diisopropylbenzene hydroperoxide, di-tert-butyl peroxide, tert-butylcumyl peroxide, dicumyl peroxide, 1,3-bis(tert-butylperoxyisopropyl)-benzene, acetyl peroxide, benzoyl peroxide, isobutyryl peroxide, bis(3,5,5-trimethylhexanoyl) peroxide and methyl ethyl ketone peroxide.

The amount of grafting monomer in the blend of (A1) and (A2) modified by the grafting obtained in the abovementioned manner may be chosen in an appropriate manner, but it is preferably 0.01 to 10%, better still 600 ppm to 6%, with respect to the weight of grafted (A1) and (A2).

The amount of grafted monomer is determined by assaying the succinic functional groups by FTIR spectroscopy.

The MFI of (A), that is to say of (A1) and (A2) which have been cografted, is 0.1 to 10. As regards the polyethylene (B), this is a polyethylene homopolymer or else it may be chosen from copolymers of ethylene with a monomer chosen from α-olefins, esters of unsaturated carboxylic acids or vinyl esters of saturated carboxylic acids. These monomers have already been mentioned in the definition of (A1) and (A2).

Advantageously, (B) is an LLDPE or ethylene/α-olefin copolymer.

The MFI of (B) is advantageously between 0.1 and 3.

According to one advantageous form of the invention, the binder comprises 5 to 20 parts of (A) per 95 to 80 parts of (B).

According to an advantageous form of the invention, the comonomer of (A1) is the same as that of (B) and is preferably chosen from 1-hexane, 1-octene and 1-butene.

According to one particular form of the invention, the polymer (A), that is to say the cografted (A1) and (A2), is such that:

(A1) comprises at least 75 mol % of ethylene and has an $MFI_2/[\eta]^{-8.77}$ ratio of greater than 15 in absolute value;

(A2) comprises at least 50 mol % of ethylene;

(A2) has an $MFI_2/[\eta]^{-8.77}$ ratio greater than 15 absolute value;

its ethylene content is not less than 70 mol %;

the $MFI_{10}/MFI_2$ ratio is between 5 and 20, where $MFI_2$ is the melt flow index at 190° C. under a load of 2.16 kg, measured according to ASTM D 1238 and $MFI_{10}$ is the melt flow index at 190° C. under a load of 10 kg according to ASTM D 1238, the intrinsic viscosity $[\eta]$ denoting the viscosity index in dl/g of a polymer measured in a decalin solution at 135° C.

The multilayer structure of the present invention includes the layer comprising the above binder and a layer (E) of oxygen-containing or nitrogen-containing polar resin, or a metal layer.

Examples of preferred polar resins in the layer other than the binder are polyamide resins, an aliphatic polyketone, a saponified ethylene-vinyl acetate copolymer and polyester.

More specifically, they comprise long-chain synthetic polyamides having structural units of the amide group in the main chain, such as PA-6, PA-6,6, PA-6,10, PA-11, PA-6/6,6 and PA-12; a saponified ethylene-vinyl acetate copolymer having a degree of saponification of approximately 90 to 100 mol %, obtained by saponifying an ethylene/vinyl acetate copolymer having an ethylene content of approximately 15 to 60 mol %; polyesters such as polyethylene terephthalate, polybutylene terephthalate and polyethylene naphthenate, blends of these resins, or else aromatic polyesters such as liquid-crystal polymers.

The metal layer may, for example, be a sheet, a film or a foil of a metal such as aluminum, iron, copper, tin and nickel or an alloy containing at least one of these metals as the main constituent. The thickness of the film or of the foil may be suitably chosen and is, for example, approximately 0.01 to approximately 0.2 mm. It is common practice to degrease the surface of the metal layer before laminating the binder of the invention to it. The layer of oxygen-containing or nitrogen-containing polar resin (E) may also contain known additives in conventional amounts.

The invention also relates to a structure comprising respectively a polyolefin layer (F), a layer of the binder of the invention and either a layer (E) of nitrogen-containing or oxygen-containing polar resin or a metal layer. According to another particular embodiment, the invention relates to a structure respectively comprising an HDPE layer, a layer of the binder of the invention, a layer of EVOH or of a EVOH alloy, a layer of the binder of the invention and an HDPE layer. Advantageously, it is in the form of rigid hollow bodies having a volume of 0.1 to 200 liters. The total thickness is between 0.2 and 20 mm, the EVOH representing 0.5 to 15% of this thickness, each binder layer 0.2 to 10% and the two HDPE layers the balance. The MFI of the HDPE is preferably 3 to 17 g/10 min. at 190° C./21.6 kg.

The MFI of the EVOH is preferably 1 to 10 g/10 min. at 190° C./2.16 kg.

Advantageously, the external layer of HDPE may be replaced by two layers, the outer one made of optionally coloured virgin HDPE and the other made of recycled product coming from scrap and cuttings from the extrusion-blow moulding of these hollow bodies. The thickness of the external HDPE layer added to the thickness of the layer of recycled material is essentially the same as in the case of a single HDPE external layer.

These structures are useful for making petrol tanks or tubings, for filling petrol tanks.

The various layers of the structures of the invention may contain additives such as fillers, stabilizers, slip agents, antistatic agents and fire-retardants.

The structures of the invention may be manufactured by coextrusion and extrusion-blow moulding processes, known in the field of thermoplastics.

EXAMPLES

The examples presented correspond to 5-layer structures from bottles produced by extrusion-blow moulding under the following conditions.

Structure of the bottle:

3 constituents, 5 layers;

HDPE/binder/EVOH/binder/HDPE;

thicknesses: 1.2/0.1/0.15/0.1/1.2 mm;

HDPE: relative density=0.945–0.950 and MFI=5–6 g/10 min. (190° C./21.6 kg);

EVOH: ethylene content=29% MFI=1.7 g/10 min. (190° C./2.16 kg).

Type of bottle:

Cylinder (Ø=70 mm) with 2 plane faces, 0.7 liter, height= 270 mm and weight=170 g.

| | Extrusion-blow moulding conditions | | | | | |
|---|---|---|---|---|---|---|
| | Temperature profiles (° C.): | | | | | |
| | | | | | | Head |
| HDPE | 200 | 210 | 220 | 230 | 230 | 230 |
| Binder | 210 | 220 | 220 | 220 | 220 | 230 |
| EVOH | 180 | 190 | 200 | 210 | 220 | 230 |

Tooling Diameter of the die=20 mm Diameter of the mandrel=12 mm Gap=4 mm

Blowing stretch ratio: approximately 3.

Measurement of the interlayer peel strength

15×150 mm test-pieces cut from the plane parts of the bottle and conditioned for at least 24 hours at 23° C. and 50% RH;

cutter initiation at one of the binder/EVOH interfaces;

"T" peel test at a crosshead speed of 50 mm/min. The peel strength, expressed in N/cm, is given by the plateau value of the peel force, excluding the starting peak. The results are given in Table 1 below, in which "MA" denotes maleic anhydride and the weight percentage of the cografted blend denotes the proportion of A in the A+B blend.

TABLE 1

| Formulations | | Example 1 | Example 2 | Example 3 | Example 4 |
|---|---|---|---|---|---|
| Polymer A1 | Comonomer | 1-octene | 1-butene | 1-hexene | 1-octene |
| | Relative density (g/cm$^3$) | 0.919 | 0.917 | 0.918 | 0.919 |
| | MFI (g/10 min./2.16 kg) | 4.4 | 2.5 | 3 | 4.4 |
| | % by weight | 75 | 90 | 80 | 75 |
| Polymer A2 | Comonomer | propylene | 1-butene | 1-octene | 1-octene |
| | Relative density (g/cm$^3$) | 0.880 | 0.900 | 0.870 | 0.870 |
| | MFI (g/10 min./2.16 kg) | 0.2 | 2.8 | 5 | 5 |
| | % by weight | 25 | 10 | 20 | 25 |
| Cografted blend A | MA content (ppm) | 3800 | 7500 | 4000 | 8000 |
| | % by weight | 20 | 10 | 15 | 15 |
| Polymer B | Comonomer | 1-octene | 1-butene | 1-hexene | 1-octene |
| | Relative density (g/cm$^3$) | 0.919 | 0.919 | 0.921 | 0.920 |
| | MFI (g/10 min./2.16 kg) | 1.1 | 1 | 0.5 | 1 |
| A + B blend | Relative density (g/cm$^3$) | 0.917 | 0.919 | 0.919 | 0.918 |
| | MFI (g/10 min./2.16 kg) | 1.0 | 0.8 | 0.5 | 1.1 |
| | MA content (ppm) | 760 | 750 | 600 | 1200 |
| Peel strength | (N/cm) | 50 | 47 | 45 | 49 |

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above, and of corresponding French application 99/04262, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A coextrusion binder comprising:
   5 to 30 parts of a polymer (A) comprising a blend of a polyethylene (A1) of relative density between 0.910 and 0.940 and of a polymer (A2) selected from the group consisting of elastomers, very low-density polyethylenes having a relative density of 0.860 to 0.880 and metallocene polyethylenes, wherein both (A1) and (A2) are grafted with an unsaturated carboxylic acid;
   95 to 70 parts of an ungrafted polyethylene (B) of relative density between 0.910 and 0.930;
   the blend of (A) and (B) having:
      a relative density of between 0.910 and 0.930,
      a content of grafted unsaturated carboxylic acid between 30 and 10,000 ppm, and
      an MFI (ASTM D 1238; 190° C./2.16 kg) between 0.1 and 3 g/10 min., MFI standing for the melt flow index.

2. A binder according to claim 1, having a relative density of between 0.915 and 0.920.

3. A binder according to claim 1, in which the comonomer of (A1), before grafting, is the same as that of (B).

4. A binder according to claim 1, wherein:
   (A1) comprises at least 75 mol % of ethylene in the polyethylene and has an MFI$_2$/[η]$^{-8.77}$ ratio greater than 15 in absolute value;
   (A2) comprises at least 50 mol % of ethylene in the elastomer, very low-density polyethylene or metallocene polyethylene;
   (A2) has an MFI$_2$/[η]$^{-8.77}$ ratio greater than 15 in absolute value;
   (A) has an ethylene content not less than 70 mol %;
   the MFI$_{10}$/MFI$_2$ ratio is between 5 and 20, where MFI$_2$ is the melt flow index at 190° C. under a load of 2.16 kg, measured according to ASTM D 1238, and MFI$_{10}$ is the melt flow index at 190° C. under a load of 10 kg according to ASTM D 1238, the intrinsic viscosity [η] denoting the viscosity index in dl/g of a polymer measured in a decalin solution at 135° C.

5. A multilayer structure comprising a layer comprising the binder of claim 1 and, directly attached to the latter, a layer (E) which is a layer of a nitrogen-containing or oxygen-containing polar resin or a metal layer.

6. A structure according to claim 5, in which either a polyolefin layer (F) or the layer (E) or a metal layer is directly attached on the binder side.

7. A structure according to claim 6, respectively comprising an HDPE layer, a first layer of said binder, a layer of EVOH or of an EVOH alloy, a second layer of said binder and an HDPE layer.

8. A rigid hollow body made of a structure according to claim 5.

9. A gasoline tank comprising a structure according to claim 7.

10. A multilayer structure of claim 5, wherein layer (E) is a layer of a nitrogen-containing or oxygen-containing polar resin which is a polyamide, an aliphatic polyketone, a saponified ethylene-vinyl acetate copolymer or a polyester resin or a metal layer.

11. A binder according to claim 1, wherein (A2) is a very low density polyethylene having a relative density selected in a manner whereby the blend of (A) and (B) has a relative density of 0.910 to 0.930.

12. A binder according to claim 1, wherein (A2) is a very low density polyethylene having a relative density selected in a manner whereby the blend of (A) and (B) has a relative density of 0.915 to 0.920.

13. A coextrusion binder comprising:
   5 to 30 parts of a polymer (A) comprising a blend of a polyethylene (A1) of relative density between 0.910 and 0.940 and of a polymer (A2) selected from the group consisting of elastomers, very low-density polyethylenes having a relative density of 0.860 to 0.880 and metallocene polyethylenes, wherein both (A1) and (A2) are grafted with an unsaturated carboxylic acid or with a functional derivative of an unsaturated carboxylic acid;
   95 to 70 parts of an ungrafted polyethylene (B) of relative density between 0.910 and 0.930;

the blend of (A) and (B) having:
  a relative density of between 0.910 and 0.930,
  a content of grafted unsaturated carboxylic acid between 30 and 10,000 ppm, and
  an MFI (ASTM D 1238; 190° C./2.16 kg) between 0.1 and 3 g/10 min., MFI standing for the melt flow index.

14. A binder according to claim 13, wherein the functional derivative of an unsaturated carboxylic acid is an anhydride, ester, amide, imide or a metal salt of an unsaturated carboxylic acid.

15. A binder according to claim 13, wherein the functional derivative of an unsaturated carboxylic acid is an anhydride of a dicarboxylic acid.

16. A binder according to claim 13, wherein the functional derivatives of an unsaturated carboxylic acid is a $C_1$–$C_8$ alkyl ester or a glycidyl ester of an unsaturated carboxylic acid.

17. A binder according to claim 13, wherein the functional derivative of an unsaturated carboxylic acid is maleic anhydride.

18. A binder according to claim 13, wherein:
  (A1) comprises at least 75 mol % of ethylene in the polyethylene and has an $MFI_2/[\eta]^{-8.77}$ ratio greater than 15 in absolute value;
  (A2) comprises at least 50 mol % of ethylene in the elastomer, very low-density polyethylene or metallocene polyethylene;
  (A2) has an $MFI_2/[\eta]^{-8.77}$ ratio greater than 15 in absolute value;
  (A) has an ethylene content not less than 70 mol %;
  the $MFI_{10}/MFI_2$ ratio is between 5 and 20, where $MFI_2$ is the melt flow index at 190° C. under a load of 2.16 kg, measured according to ASTM D 1238, and $MFI_{10}$ is the melt flow index at 190° C. under a load of 10 kg according to ASTM D 1238, the intrinsic viscosity $[\eta]$ denoting the viscosity index in dl/g of a polymer measured in a decalin solution at 135° C.

19. A multilayer structure comprising a layer comprising the binder of claim 13 and, directly attached to the latter, a layer (E) which is a layer of a nitrogen-containing or oxygen-containing polar resin or a metal layer.

20. A rigid hollow body made of a structure according to claim 19.

21. A binder according to claim 1, wherein (B) is a linear low-density polyethylene.

22. A binder according to claim 1, wherein
  (A1) has an MFI (ASTM D 1238; 190° C./2.16 kg) between 0.1 and 8 g/10 min.,
  (A2) has an MFI (ASTM D 1238; 190° C./2.16 kg) between 0.1 and 20 g/10 min., and
  (B) has an MFI (ASTM D 1238; 190° C./2.16 kg) between 0.1 and 3 g/10 min., MFI standing for the melt flow index.

23. A binder according to claim 1, wherein (A2) is selected from the group consisting of elastomers and metallocene polyethylenes.

24. A binder according to claim 13, wherein (B) is a linear low-density polyethylene.

25. A binder according to claim 13, wherein
  (A1) has an MFI (ASTM D 1238; 190° C./2.16 kg) between 0.1 and 8 g/10 min.,
  (A2) has an MFI (ASTM D 1238; 190° C./2.16 kg) between 0.1 and 20 g/10 min., and
  (B) has an MFI (ASTM D 1238; 190° C./2.16 kg) between 0.1 and 3 g/10 min., MFI standing for the melt flow index.

26. A binder according to claim 13, wherein (A2) is selected from the group consisting of elastomers and metallocene polyethylenes.

* * * * *

UNITED STATES PATENT AND TRADEMARK OFFICE
CERTIFICATE OF CORRECTION

PATENT NO. : 6,924,013 B1
DATED : August 2, 2005
INVENTOR(S) : Jean-Claude Jammet It is certified that error appears in the above-identified patent and that said Letters Patent is hereby corrected as shown below:

Column 9,
Line 15, reads "derivatives", should read -- derivative --.

Signed and Sealed this

Twenty-fifth Day of October, 2005

JON W. DUDAS
*Director of the United States Patent and Trademark Office*